July 20, 1948.   J. G. CROSBY   2,445,605
VARIABLE THROW ECCENTRIC
Filed March 5, 1943   2 Sheets-Sheet 1
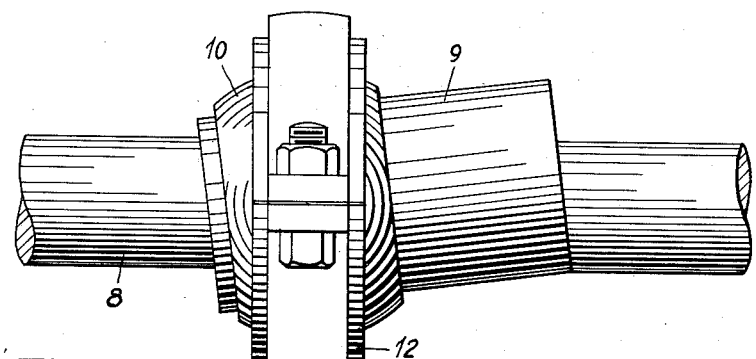
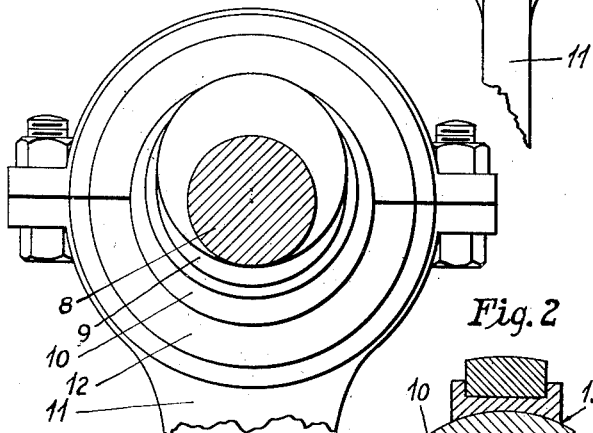
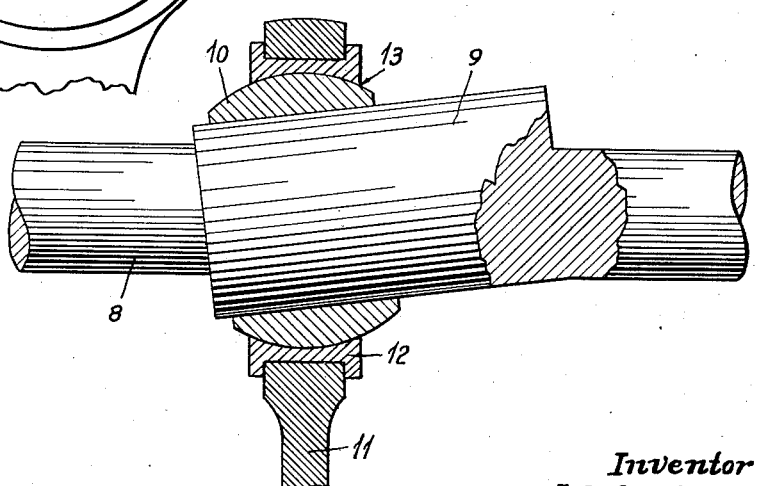
Inventor
J. G. Crosby
per
Harry N. Kilgore
Attorney July 20, 1948. J. G. CROSBY 2,445,605
VARIABLE THROW ECCENTRIC
Filed March 5, 1943 2 Sheets-Sheet 2
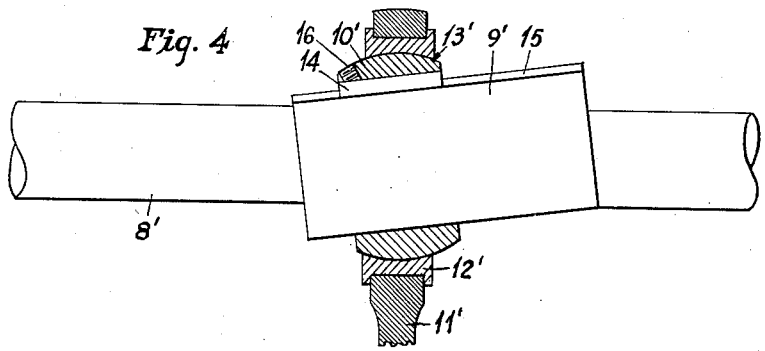
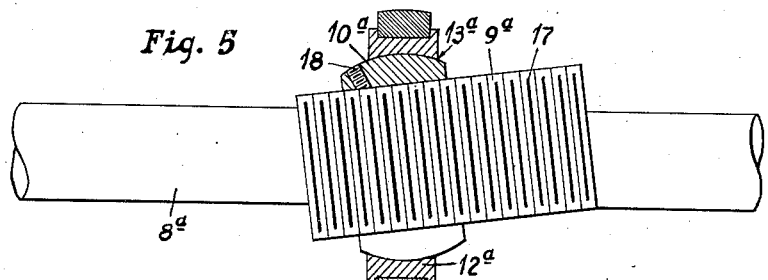
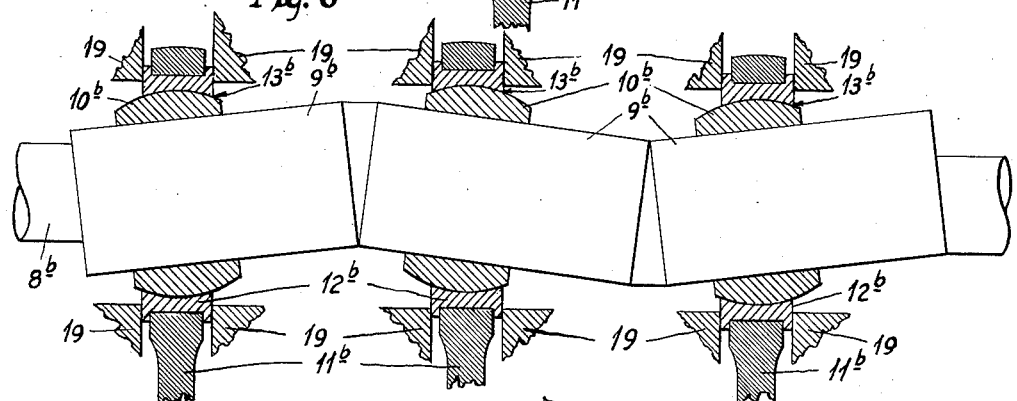
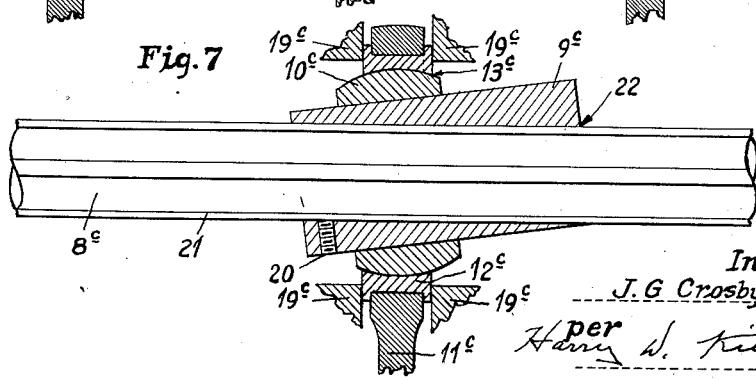
Inventor
J. G. Crosby
per Harry W. Kilgore
Attorney Patented July 20, 1948

2,445,605

UNITED STATES PATENT OFFICE 2,445,605

VARIABLE THROW ECCENTRIC

John G. Crosby, Minneapolis, Minn.

Application March 5, 1943, Serial No. 478,168

1 Claim. (Cl. 74—571)

My invention relates to improvements in variable throw eccentrics intended for general use.

An object of this invention is to provide an eccentric device designed to produce an infinite number of crank offsets. Another object of the invention is to provide an eccentric device that is extremely simple, highly efficient, and of relatively small cost to manufacture.

A further object of the invention is to provide an eccentric device that can be adjusted to vary the crank offset while said device is operating.

Other objects of the invention will be apparent from the following description, reference being had to the accompanying drawings.

A further object of the invention is to provide an eccentric device including a shaft having a crank member, the axis of which is at an oblique angle to the axis of the shaft and adjustable means subject to the crank member, making possible a range of oscillations exerting a force at right angles to the axis of the shaft.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a fragmentary elevation showing one embodiment of the invention;

Fig. 2 is a view of the parts shown in Fig. 1 partly in elevation and partly in section;

Fig. 3 is an end elevation of the parts shown in Fig. 1; and

Figs. 4, 5, 6 and 7 are views partly in diagram and section, showing further embodiments of the invention.

Referring first to the invention shown in Figs. 1 to 3, inclusive, the numeral 8 indicates a main cylindrical shaft mounted in suitable bearings, not shown. A cylindrical crank member 9 is formed, as shown, as an integral part of the shaft 8 with its axis intersecting the axis of the shaft 8 at an oblique angle thereto, the diameter of the crank member 9 being materially larger than the diameter of the shaft 8. A spherical ring member 10 is mounted on the crank member 9 for axial movement from the intersection of the axes of the shaft and the crank member 9, which is neutral, and thereby makes possible an infinite number of crank offsets. The diameter of the crank member 9 is such, in respect to the shaft 8, that the ring member 10 may be adjusted from one extremity thereof to the other.

Obviously, rotation of the shaft 8 will carry the ring member 10 in an eccentric course about the axis of the shaft 8. The offset of the ring member 10 from the axis of the shaft 8, which varies the throw of the eccentric device, may be varied, at will, by axially adjusting the ring member 10 on crank member 9. When the ring member 10 is at the intersection of the axes of the shaft 8 and the crank member 9, which is neutral, said ring member may be moved into an infinite number of crank offset positions in the crank member 9 to vary the throw of the eccentric device.

A connecting rod 11, actuated by the ring member 10, has a two-part bearing 12, in which said ring member works. The contacting surfaces between ring member 10 and the bearing 12 are spherical and thereby afford a ball and socket joint 13 between said ring member and bearing. This ball and socket joint 13 permits the connecting rod 11 to be positioned to exert an oscillating force at right angles to the axis of the shaft 8.

In Fig. 4 parts corresponding to like parts in Figs. 1, 2 and 3 are given the same reference numerals followed by a prime ('). In this modification of the invention, a key 14 and a co-operative keyway 15 hold the ring member 10' on the crank member 9' for common rotation therewith, but permits the required axial adjustment to vary the crank offset of the eccentric device. A set screw 16 in the ring member 10' impinges against the key 14, clamps the same in the keyway 15 and thereby holds the ring member 10' where adjusted on the crank member 9'.

In Fig. 5, parts corresponding to like parts in Figs. 1, 2 and 3 are given the same reference numeral followed by the letter a. Screw-threads 17 in this modification adjustably connect the ring member 10ª to the crank member 9ª. A set screw 18 holds the ring member 10ª where adjusted on the crank member 9ª.

Referring now to the modification shown in Fig. 6, parts corresponding to like parts in Figs. 1, 2 and 3 are given the same reference numerals followed by the letter b. In this structure, a plurality of crank members 9ᵇ are provided and the bearings 12ᵇ are held thereon against axial movement by opposing pairs of members 19 which may be assumed to be parts of a crank case. By holding the bearings 12ᵇ against axial movement, they, in turn, hold the ring members 10ᵇ and the connecting rods 11ᵇ against like movements. As shown, the axes of the two end crank members 9ᵇ are parallel and the axis of the intermediate crank member 9ᵇ is oblique thereto but in the same angle in respect to the axis of the shaft 8ᵇ. While three crank members 9ᵇ are shown, it will be understood that two or more thereof may be provided, together with a ring member 10ᵇ for each thereof. To adjust the ring members 10ᵇ on the crank members 9ᵇ, the shaft 8ᵇ, to which said crank members are secured, may be adjusted axially.

In the modification shown in Fig. 7, parts that correspond to like parts in Fig. 6 are given the same reference numeral followed by the letter c. In this structure, the crank member 9ᶜ is free for axial movement on the shaft 8ᶜ and a set screw 20 normally holds the crank member 9ᶜ where adjusted on the shaft 8ᶜ. By moving the crank member 9ᶜ endwise on the shaft 8ᶜ, the same will be adjusted axially in the ring member 10ᶜ to vary the crank offset of said ring. Splines 21 on the shaft 8ᶜ work in grooves 22 in the crank member 9ᶜ and thereby hold said crank member for common rotation with the shaft 8ᶜ.

It will be understood that the invention described is capable of various modifications within the scope of the invention herein disclosed and claimed.

What I claim is:

In a device of the class described, a rotatable shaft having a cylindrical crank member, the axis of which intersects the axis of the shaft, and a ring member having screw-threaded engagement with the crank member, one of said members being adjustable relative to the other to vary the throw of the ring member.

JOHN G. CROSBY.

REFERENCES CITED

The following references are of record in the file of this patent:

UNITED STATES PATENTS

| Number | Name | Date |
|---|---|---|
| 338,482 | Castle | Mar. 23, 1886 |
| 431,735 | Armstrong | July 8, 1890 |
| 547,853 | Johansson | Oct. 15, 1895 |